United States Patent [19]
Longacre, Jr.

[11] Patent Number: 5,231,293
[45] Date of Patent: Jul. 27, 1993

[54] BAR CODE READING INSTRUMENT WHICH PROMPTS OPERATOR TO SCAN BAR CODES PROPERLY

[75] Inventor: Andrew Longacre, Jr., Skaneateles, N.Y.

[73] Assignee: PSC, Inc., Webster, N.Y.

[21] Appl. No.: 786,206

[22] Filed: Oct. 31, 1991

[51] Int. Cl.⁵ ............................................. G06K 7/10
[52] U.S. Cl. .................................. 250/568; 235/472
[58] Field of Search ...................... 235/462, 466, 472; 340/707; 250/568

[56] References Cited

U.S. PATENT DOCUMENTS 4,146,782  3/1979  Barnich ............................ 235/466
4,251,798  2/1981  Swartz et al. .
4,360,798  11/1982  Swartz et al. .
4,782,220  11/1988  Shuren ............................ 235/466

OTHER PUBLICATIONS

American National Standard, ANSI X3.182-1990, published by the American National Standards Institute, pp. 1-8 & cover sheet.

*Primary Examiner*—David C. Nelms
*Assistant Examiner*—K. Shami

[57] ABSTRACT

A hand-held instrument for reading a bar code symbol, and analyzing the print quality of the code upon manually scanning the code has a graphic display. The display is driven by a computer which has memory (a block in RAM) in which a multiplicity of data samples representing the reflectance profile of the bar code pattern are entered at a constant rate. The print quality analysis is based upon these samples. The number (count) of these samples represents the duration of the elements (bars and spaces) constituting the code. When the number of samples in successive, adjacent characters (groups of elements, a string of which represents a valid code) differs by 25%, the display is driven to prompt the operator to scan the code again, but more evenly without jerky motion (accelerations or decelerations). When the capacity of the memory block allocated to the scan profile data samples is exceeded, the operator is prompted by the display to scan faster. When the average duration of the elements as represented by the average number of samples (counts) in a narrow element in the code is less than six samples, the operator is prompted by the display to scan slower.

15 Claims, 6 Drawing Sheets

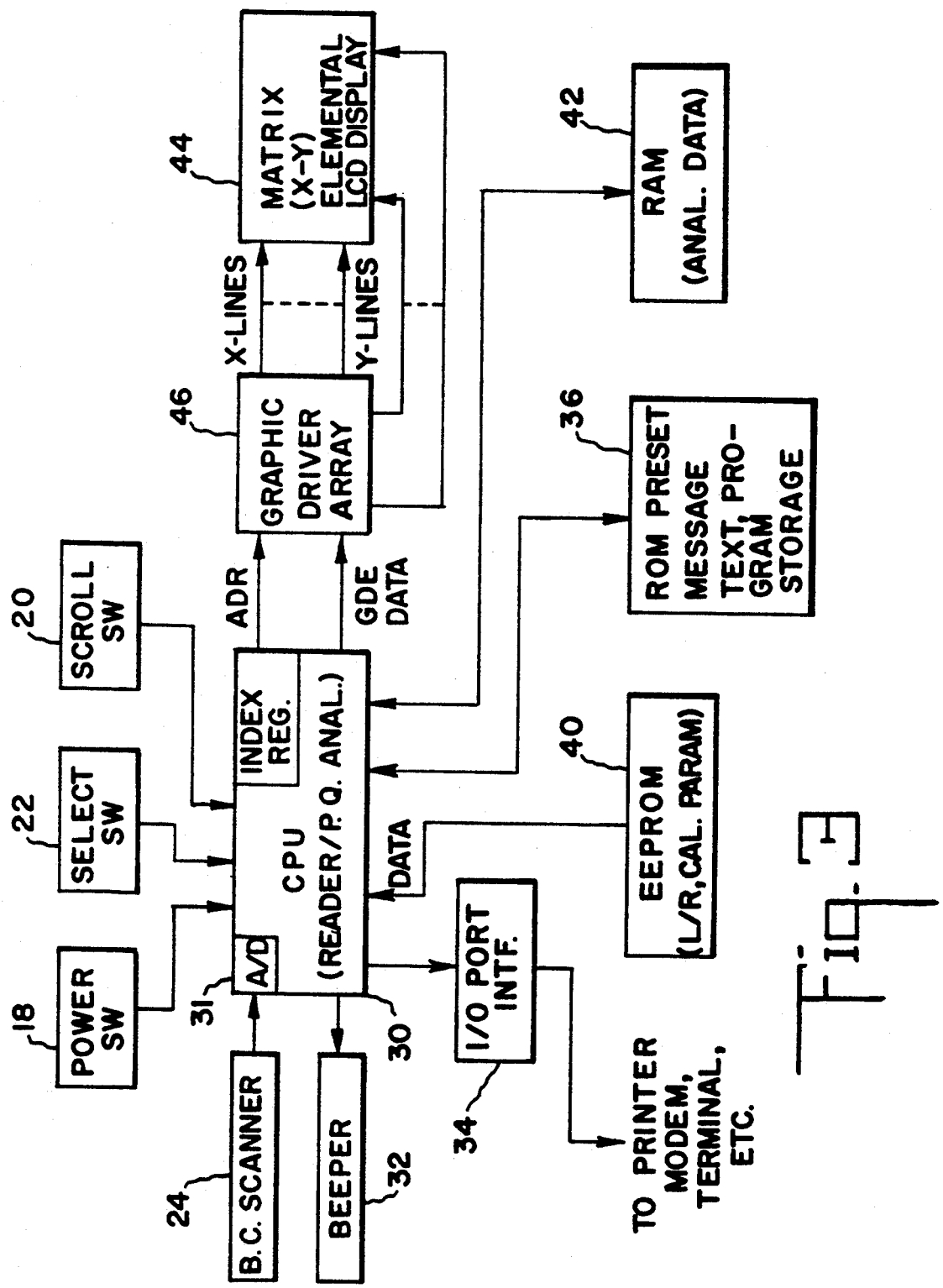

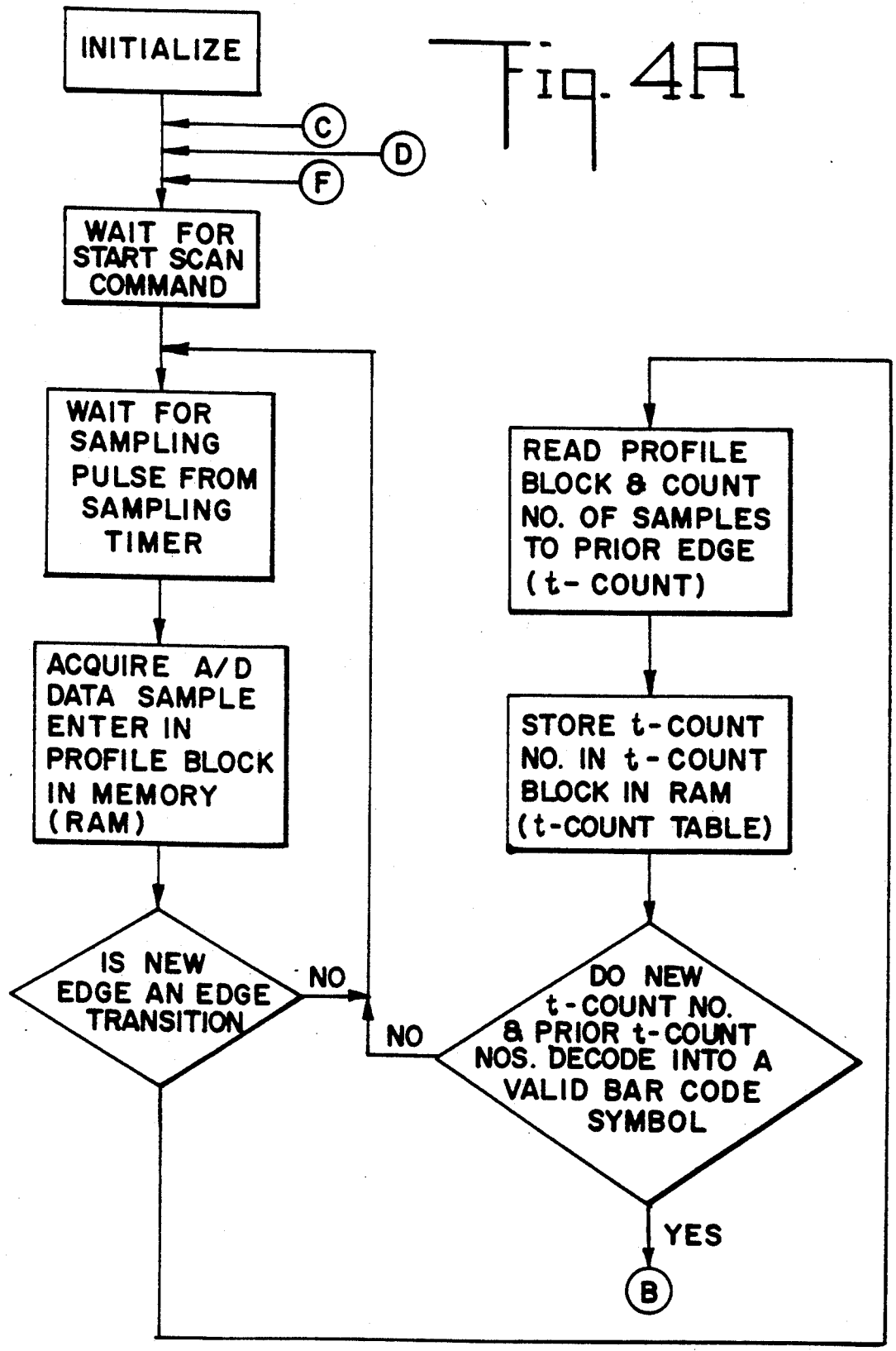

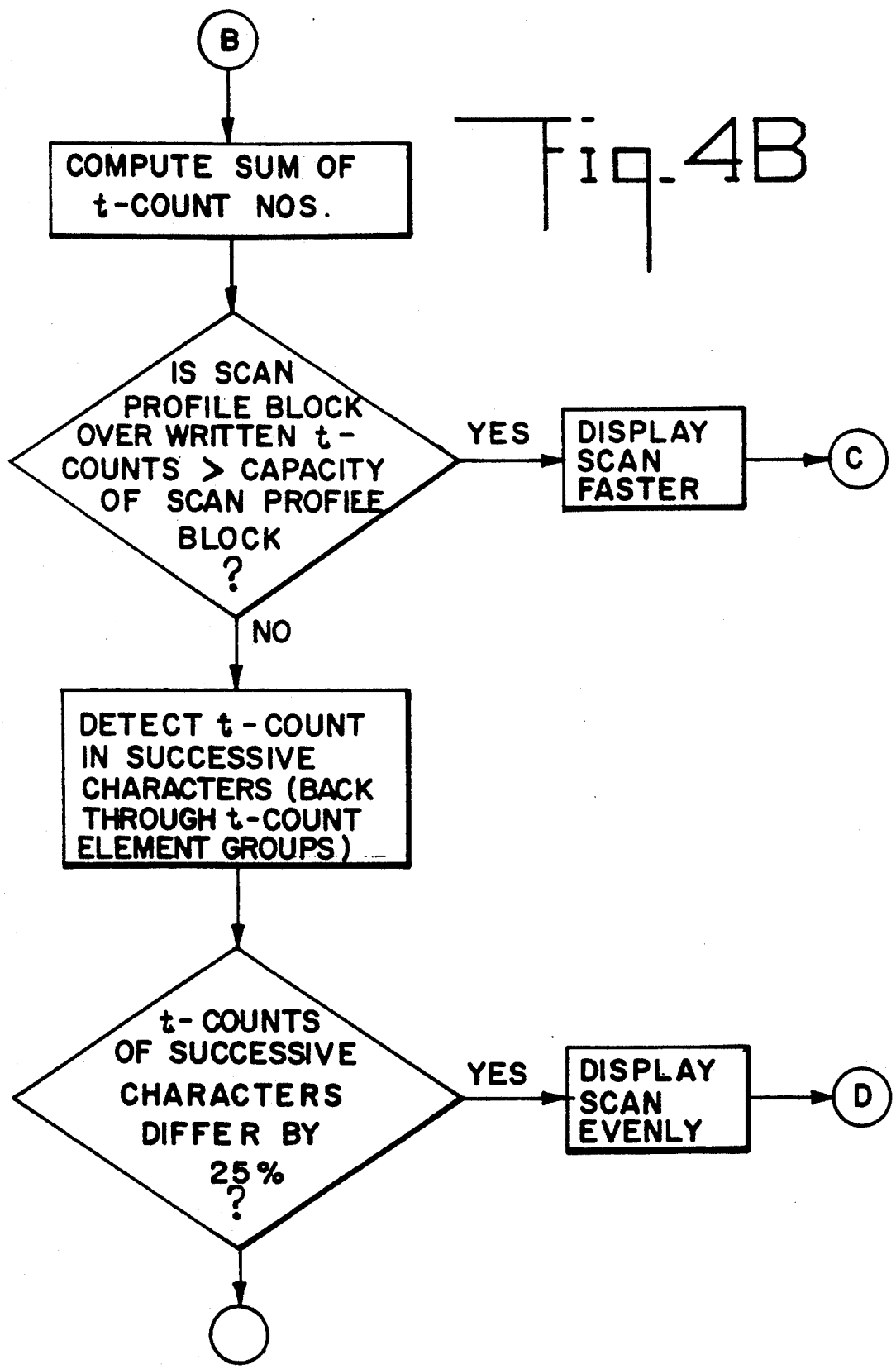
Fig_4B

BAR CODE READING INSTRUMENT WHICH PROMPTS OPERATOR TO SCAN BAR CODES PROPERLY

DESCRIPTION

The present invention relates to bar code reading instruments which are manually scanned across a code (sometimes called a wand), for reading the code, and particularly a system for indicating, on a display associated with the instrument, messages as to improper scanning modes (excessively fast or slow or uneven (jerky) scanning) which prompt the operator to scan properly.

This application is related to U.S. patent application Ser. No. 07/773,488, filed Oct. 9, 1991, in the names of Charles E. Biss, Andrew Longacre, Jr. and L. Michael Hone, which is assigned to the same assignee as this application and which is for features of a bar code reading instrument which can analyze bar code print quality and enable display of the parameters of the code and other information either in upright or inverted orientation to facilitate use of the instrument, in either hand, by the operator.

The invention is especially suitable for use in a handheld instrument for analyzing the print quality of bar code symbols, and provides an instrument for such purpose adapted to be held in one hand while carrying out all functions of reading, analysis and display of the procedures for carrying out the analysis and the results thereof. It is a feature of this invention to facilitate use of the instrument by operating a graphics display to present messages useful in operating the instrument by instructing the operator to scan the code properly (not too fast or too slow or with jerky motion).

Bar code print quality determines whether a printed bar code symbol is decodable reliably and consistently. The American National Standards Institute has developed quality parameters for printed bar code symbols. These parameters and algorithms and flow charts for the computerized measurement thereof from the analog signal resulting from scanning of a printed bar code symbol is set forth in American National Standard, ANSI X3.182-1990 which is published by the American National Standards Institute, 1430 Broadway, New York, N.Y. 10018 U.S.A. The Standard also defines bar code symbologies, and the symbology used determines whether the print quality of the code is acceptable. An instrument for measurement of bar code print quality which has been available is the "Quick Check" which is sold by Photographic Sciences Corporation, 770 Basket Road, Webster, N.Y. 14580 U.S.A. Other earlier attempts to provide instruments for print quality measurement are the subject matter of U.S. Pat. Nos. 4,251,798 and 4,360,798.

Accurate measurement of print quality requires that the bar code be scanned properly so that its profile accurately reflects the dimensions and contrast of the bars and spaces constituting the code. When the code is not scanned evenly at a uniform speed or is scanned too fast or took slow, reliable, accurate measurements are difficult if not impossible to obtain. Likewise, reading of codes to obtain the characters represented by the code for use in commercial transactions and industrial applications, as to identify products and parts, require uniform scanning at proper speed to provide accurate, reliable code reading. Oftentimes, bar code readers are manually scanned or swept across the code. Most instruments do not apprise the operator that he or she has scanned a code improperly. The instrument merely fails to read the code. Time is lost and stressful frustration can result. In Quick Check instruments which have been heretofore available, means have been provided to prompt the operator to scan slower by searching for the narrowest element (bar or space). If that element is less than a certain duration, this criteria indicates that the code was scanned too fast and a message prompting the operator to scan slower is displayed. No facilities were provided in these prior Quick Check instruments to prompt the operator that he or she was otherwise scanning improperly, i.e., too slow or in an uneven or jerky mode. Also, the detection of an excessively fast scan was not consistently accurate, since all of the elements of the code were not considered in determining whether the code was scanned too fast.

Accordingly, it is an object of the present invention to provide an improved bar code reading instrument capable of displaying a multiplicity of different messages instructing the operator as to proper scanning, e.g., whether a scan was too fast, too slow, or uneven.

It is a still object of the invention to provide an improved instrument for reading bar codes by manually scanning the codes for analysis or verification of the print quality of the codes so read.

It is a more general object to provide an improved bar code reading instrument which prompts the operator as to how the codes are scanned during reading operations.

Briefly described, a graphic display system embodying the invention, which is especially useful in a bar code print quality measuring instrument, includes a display, such as an LCD display, having a matrix of elements switchable between light and dark states, from which elements images of characters, words or the segments of characters may be formed. Data signals are generated, suitably in a computer which has as its inputs bar code signals which are derived from a bar code reader (also referred to as a scanner), representing the characters or legends or other information (e.g., values along a scale) to be displayed. The code is manually scanned by the operator to provide bar code signals representing the reflectance profile of the code. These signals are sampled at a constant rate to provide successive data signal samples. The samples are entered in a memory (RAM) associated with the computer and stored in a scan profile block in the memory. The durations of the elements and groups of elements constituting the characters of the code are also stored in the memory in terms of counts of the number of samples thereof (t-counts). Outputs indicative of an unevenly executed scan are obtained from the difference in counts constituting successive characters. Outputs indicative of an excessively slow scan are obtained when the counts exceed the capacity of the scan profile memory block. Outputs indicative of an excessively fast scan are obtained when an average of all narrow elements in a code are represented by less than a certain number of counts.

The foregoing and other objects, features and advantages of the invention, and a presently preferred embodiment thereof, will become more apparent from a reading of the following description in connection with the accompanying drawings in which:

FIG. 3 is a block diagram of the instrument and its display; and

FIGS. 4 A-C are a flow chart illustrating the programming of the CPU (Central Processing Unit or computer) of the system shown in FIG. 3 to operate the display to display messages as to improper scanning modes.

Figure 1:
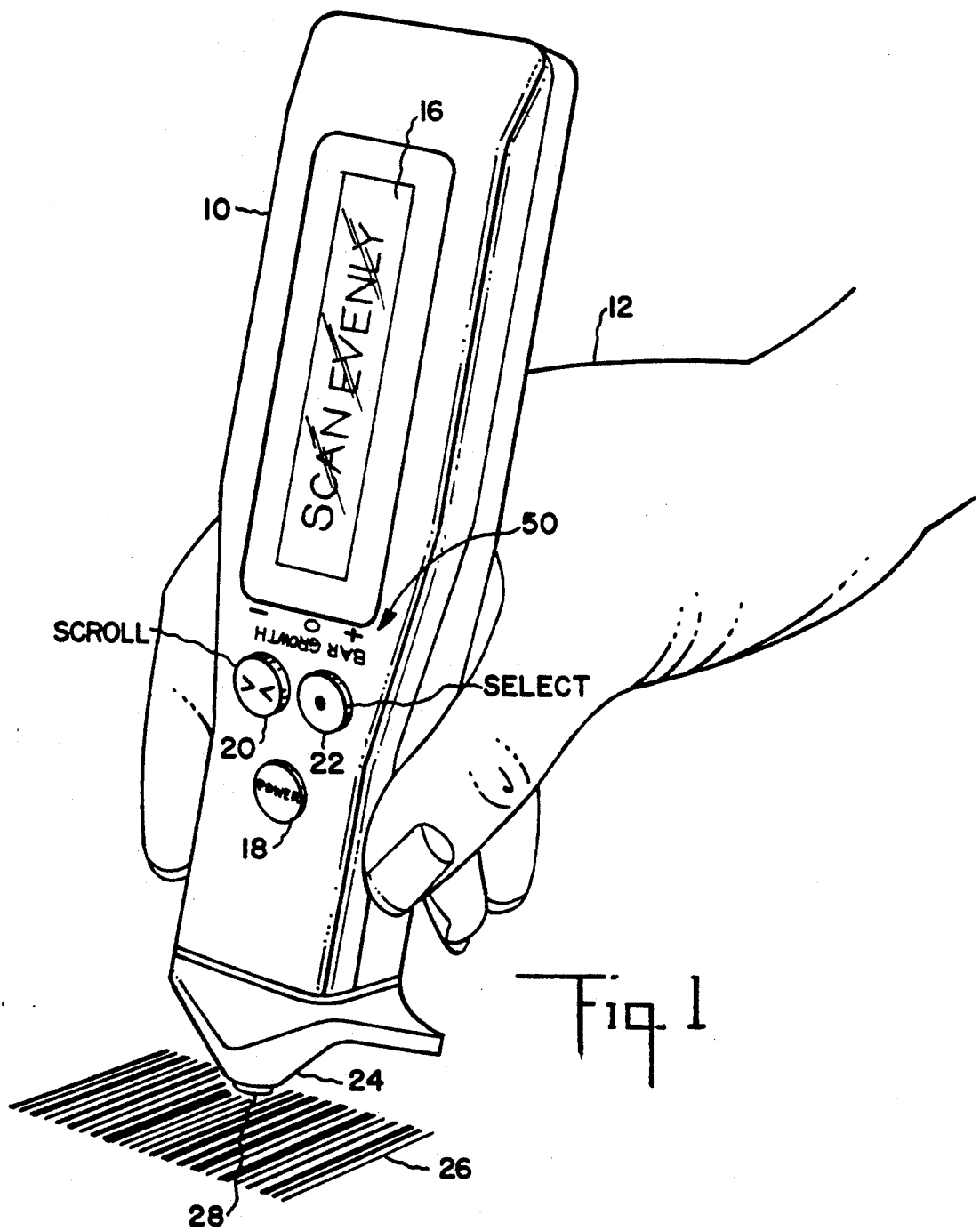
FIG. 1 is a perspective view showing a bar code print quality analyzing instrument embodying the invention.

Referring to FIG. 1, there is shown a bar code print quality measurement and analyzing instrument 10 held in the right hand 12 of the operator. The instrument is portable (having a self-contained battery) and miniaturized. It may, for example, be 7.15 inches long, 1.8 inches wide at its maximum width and 1.2 inches high between its bottom surface and top surface. There is located on the top surface an LCD display 16 and three push buttons. These are a power button 18 to turn the instrument on and off and when on, when again pressed, to provide a command which conditions the instrument to receive a new scan. A scroll button 20 scrolls or steps the instrument through different items in a menu of messages, which tell the operator to display different print quality parameters upon the operator pressing a select push button 22.

The instrument includes a bar code scanner 24 at the lower end thereof shown scanning a typical bar code 26. An optical scanner at the lower end of the instrument may be of a design which is conventional, having a light source and a photodetector. The light source directs a beam onto the code through an aperture at the lower end 28 of the scanner. The photodetector responds to light from the code and provides an analog bar code signal which is conditioned in the scanner and applied to a central processing unit for reading the code (decoding it), determining if the scanning was done properly and then driving the display to display a message such as the "SCAN EVENLY" message shown in FIG. 1, when the scanning mode was improper, before the code is analyzed for the type (symbology) of code and for print quality parameters. The scanner 24 and the CPU 30 are shown in FIG. 3.

Also as shown in FIG. 3 the CPU has input ports which provide electrical signal levels indicating the actuation of the power switch 18, the scroll switch 20 and the select switch 22. Output ports from the CPU are connected to a beeper 32 internal of the instrument 10 which provides a beep or beeps of different pitch or tonal combinations to indicate that a code has been scanned or not properly scanned and that print quality analysis computations have been completed. Another I/0 port circuit 34 enables data to be entered as to the type of code scanned, by which is meant the bar code symbology which defines the code, the characters represented by the code and also the various print quality parameters. The code symbologies and the quality parameters are defined in the above-mentioned ANSI standard.

It is also desirable to provide a quick measure of the tendency of codes to deviate from standard print quality. The average bar growth or shrinkage with respect to a standard width is a preferred measure. This shows a deviation from nominal in a code before it gets (by virtue of insufficient inking or excess inking which causes bar spreading) out of specifications for decodability or dimensional tolerances.

The display of all of these parameters requires a multiplicity of items of information. The instrument, and particularly its display system, enables all of the information to be displayed in upright position with the letters in normal sequence (e.g., left to right in English and right to left in Japanese, Hebrew, Arabic, etc.) so as to permit the display to be read while the instrument is in use either in the right hand as shown in FIG. 1 or in the left hand. These features are the subject of the above-referenced US patent application.

Returning to FIG. 3 a read-only memory (ROM) 36 stores, in different locations, pre-set messages which are displayed in a message field 38 of the display. Such messages include texts which indicate that the display is set for right-handed operation or left-handed operation. The program which the CPU executes is also stored in ROM 36. There is a non-volatile memory, such as an electrically erasable programmable read-only memory (EEPROM) 40 which contains a left/right flag (L/R) which is set in operating the instrument to flip the display either for left-handed or right-handed operation. Also set in the memory 40 are calibration parameters such as for the various industry standards. The results of the measurements including the calculated parameters are stored in random access memory (RAM) 42. These memories are addressed by an index register on the CPU chip 30 so that messages stored in different locations can be selectively accessed. Access is programmed to condition the instrument to display messages as to improper scanning mode, and if no such modes are detected, by operating the scroll and select switches 20 and 22 to display the preset messages in order. These messages define a menu. The first message at the top of the menu when power is applied (power up) may identify the instrument and the aperture of the scanner 24. For example, this start message may read "QC-200 06/660 nm" meaning that the aperture of the scanner 24 is 6 mils and the wavelength of the illuminating light is 660 nanometers.

The display is an (x-y) matrix of liquid crystal areas which can be light (reflective) or dark (non-reflective). The elements are defined by electrodes in accordance with conventional and well-known LCD technology. The display matrix is indicated at 44 in FIG. 3. The display matrix is driven by a graphics driver array 46 which has an array of storage cells. In this embodiment the array is 16 cells in the y direction and 34 cells in the x direction. The x direction is the longitudinal direction along the length of the instrument 10. The cells are connected by 16 y and 34 × lines, which for a cell which is set (high), operates an element in the display matrix 44. The driver 46 may be a commercially available integrated circuit chip. It has been found that a chip manufactured by S-MOS Systems of San Jose, Calif., USA, their type SED1502 being suitable. The chip is addressed on address lines (ADR) from the CPU and the display element data (GDE) is applied to the addressed area.

The entire display is mirror-wise symmetric about a longitudinal axis which extends through the center of the display. The legend fields for the combination of characters are in rows and columns spaced symmetrically with respect to the axis. The axis also extends through the center segment of the alphanumeric display between PCS grade legends. Accordingly, if the display is flipped to make it readily legible for either right-hand or left-hand operation, such flipping is about the axis and causes no change in the display even though the orientation thereof is changed.

The display program in ROM of the CPU is called on initialization (power up). The first index register address is to the opening message in ROM 36 and the opening message is displayed. If the display is correct, nothing further need be done. However, if the display is inverted, the L/R flag is set in the RAM 42 with an image thereof stored in the PROM 40. This is done by scrolling to an "L/R set" instruction message and then pressing the select switch. The selection is then stored non-volatively in PROM 40. On initialization the flag is set in RAM. Menuing (upon scrolling can alter the flag (for a temporary change thereof). Menuing can also update the image (stored change in the PROM), which then affects the display orientation upon the next power up (initialization). The analog bar code signal is read while the operator scans the instrument across the code 26 (FIG. 1). Then the bar code signal is sampled in an analog The message to scan and read the code then appears.

The analog bar code signal is read while the operator manually scans the instrument across the code 26 (FIG. 1). Then the bar code signal is sampled in an analog to digital converter (A/D) 31 which may be part of the CPU 30. The A/D generates data signal samples at a constant rate, e.g., 4KH$_z$, synchronous with the CPU's internal clock. These data signals are entered by the CPU in a scan profile block of locations (4K bytes) in RAM 42. The CPU is programmed to execute the program shown in FIG. 4, detects when a valid bar code is read and produces outputs which drive the display to provide messages as to improper scanning modes. These are the "Scan Evenly" message shown in FIG. 1. The other messages are "Scan Faster" and "Scan Slower".

If the scan was done properly, the system then analyzes the code per the ANSI standard or traditional measurement protocols and the results of the measurement are stored in different message data locations in RAM 42. The messages to the various legends are automatically addressed via the index register and displayed in upright position. Then the scroll switch can scroll to the desired parameter or PCS or grade field indications. Also the index register address points to the messages in ROM parameters which result in the dimensional, format or reflectance out of specification condition and sets these legends as appropriate for an out of specification print quality condition. Then the menu can be scrolled to an instruction for an appropriate parameter in the dimensional, format or reflectance categories and the various parameters thereof displayed.

The display is written to after first examining the L/R flag. If the flag is set in one state for upright display, the message from the memories in the text field and other fields of the graphics driver array in the upright position and in left to right sequence. Alternatively, if the array is set inverted, the text messages are read out to the driver array in reverse order. The display is then enabled and data from the driver array 46 is transferred to the LCD display where it is displayed in upright position and left to right or right to left sequence. The various messages are displayed in accordance with instructions from the scroll and select switch buttons 20 and 22 and which step to successive messages in the menu. When a menu item instructs the operator to scan a new code, the operations are separated.

Figure 2:
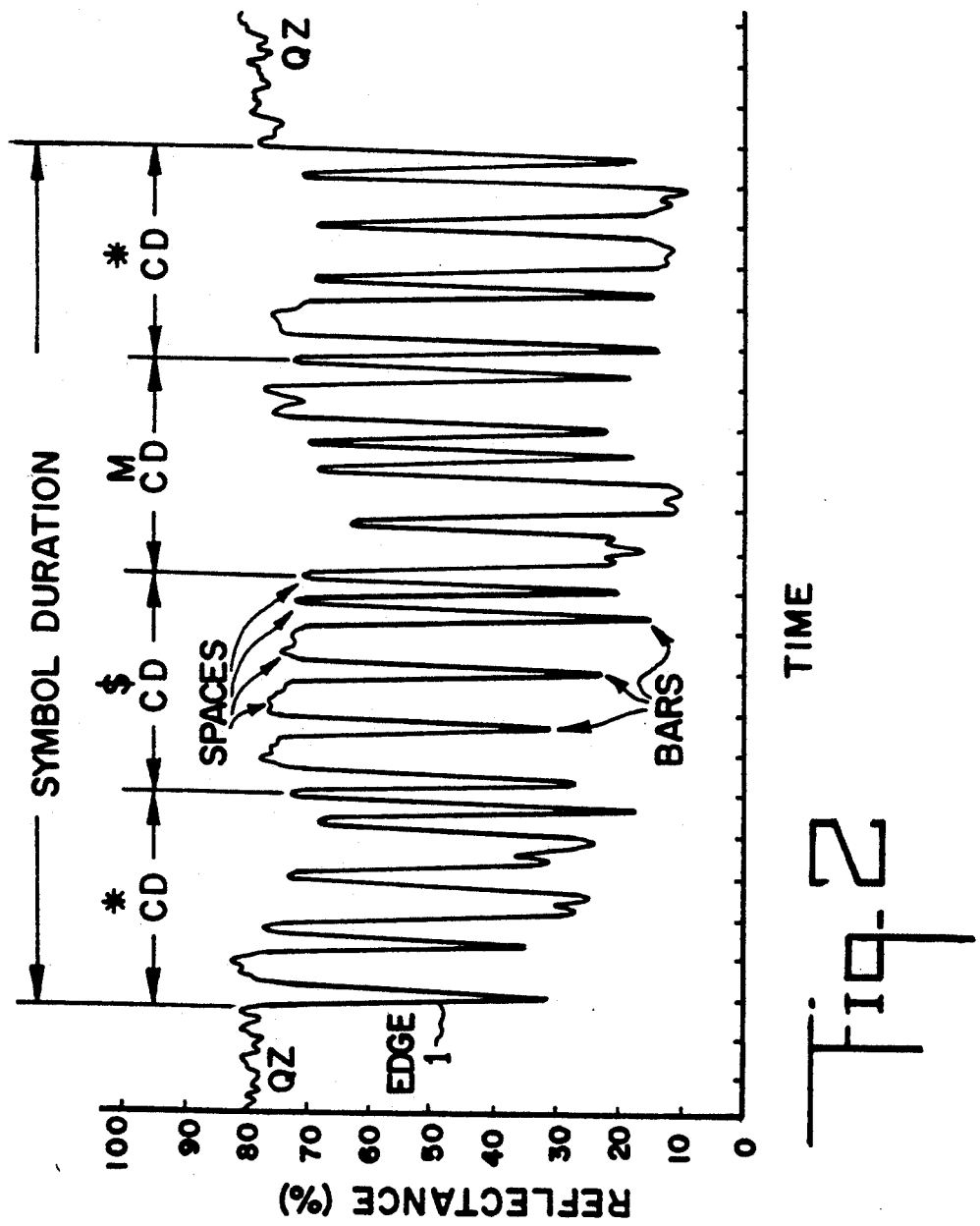
FIG. 2 is a graph of the scan reflectance profile obtained when the instrument scans an exemplary bar code with features (bars, spaces, character durations and the symbol or bar code duration) detailed.

Referring to FIG. 2 there is shown a scan profile in terms of the reflectance of light from the code as it varies during the time while the code is being scanned. The exemplary code has quiet zones which appear in the analogue bar code signal as relatively high level voltage. Between these quiet zones are the bars (relatively low in the scan profile) and spaces (relatively high in this scan profile), because the spaces are white and the high reflectance while the bars are black and of low reflectance. Spaces and bars occur alternately. A space follows a bar and a bar follows a space in time. The bars and spaces are called bar code elements. A group of these elements constitutes a character. The characters occupy successive durations indicated as CD (character duration). Only four characters are shown with Code 39 symbology in the exemplary code in FIG. 2. A code typically has 6 to 24 characters. Similar start and stop characters are indicated by the asterisks. Intervening characters are indicated as $ and M. The characters are separated by intercharacter gaps (spaces). The symbol duration is also indicated in FIG. 2.

The analog bar code signal which is sampled by the A/D 31 follows the scan profile pattern. The A/D 31 produces data signal samples at a constant rate. A suitable rate may such as to fill the scan profile block in memory with samples of an entire bar code, when properly scanned at a sufficiently fast rate within one second. When four KBytes are allocated to the scan profile samples in ram, a four KHz rate is used. These rates and scan profile memory block capacity are exemplary. Then, more or less memory may be used when the sampling rates are lower or higher, respectively. Approximately four KHz and four KBytes is presently preferred. The total symbol duration, including some of the quiet zones, is then typically stored in the profile block during a scan.

Referring to FIG. 4A the portion of the program which acquires the sample data and element durations and which also decodes the bar code to determine whether a valid bar code symbol in accordance with a certain symbology is decoded is shown. The system is initialized on power up. It is not necessary to clear RAM since new data signals are overwritten during the scan. The program waits for a start scan command. This command may come from a depression of the power button 18 (FIG. 1). Alternatively, the bar code reading instrument 10 may be provided with an optical detector which detects light when the instrument is brought close to the medium on which the bar code is printed. Then the optical detector (a photo detector) automatically generates a start scan command.

The program then waits for a sampling pulse or "tick" from a sampling timer in the CPU 30. This governs the acquisition of data samples at the constant 4KHz rate. As the samples are acquired, they are entered into the profile block in memory (the RAM 42—FIG. 3).

If a new sample has a value which is much higher than a previously detected minimum sample value, then a bar to space edge transition is detected. Alternatively, if the new sample has a value which is much lower than a maximum sample value, then a space to bar edge transition is detected. The duration of an element is determined by reading the profile block and counting the number of samples from a new edge transition to a preceding (immediately prior) edge. The number of samples is referred to as the t-count. The t-count values representing the numbers of counts between edges and therefore the numbers of counts and the duration of an element. The t-count values (separate bytes) are stored in a t-count block in RAM. This t-count block accumulates a t-count table. As successive elements, bars following spaces, are accumulated in terms of their duration, sufficient information becomes available in the t-count table to decode the bar codes symbol. The program loops until a valid bar code symbol is detected. Then there is sufficient information in terms of data samples in the profile block and in the t-count block from which outputs representing whether the scanning mode was proper in terms of speed and evenness of motion (accelerations and decelerations or jerkiness in the scanning motion).

Referring to FIG. 4B, the program proceeds via the connectors BB to compute the sum of the t-count numbers in the t-count table which were accumulated for the valid bar code symbol. If the sum of the t-counts exceeds the capacity of the scan profile block (i.e. over 4 KBytes) then the scan profile block is overwritten. Data is entered successively, much like as into a shift register, into the scan profile block so that when the code is scanned too slowly the tail end of the code is written into the front of the block. This condition is detected when the sum of the t-counts in the decoded bar code exceeds the capacity of the scan profile block (i.e. is greater than 4 KBytes). Then the computer provides output data via the driver array 46 to the display 44 to provide the "Scan Faster" message. The program then loops back to wait for another command to scan the code. This command can be generated by depressing the power button or automatically by the optical detector in the nose of the reader. The operator is prompted by the display and should scan faster the next time the code is scanned.

In order to determine whether uneven scanning occurred, the t-count sum in successive characters is detected. The t-counts in a prior character is subtracted from the t-counts in an adjacent character and the difference is computed. This may be accomplished by passing a pointer through the table of t-counts in memory which are accumulated between intercharacter gaps. If the difference in the t-counts of successive, adjacent characters differs by 25 percent, an output is provided via the computer and the array to the driver to display the scan evenly message. Again, the operator is prompted and should scan more evenly on his or her next try.

Figure 4C:
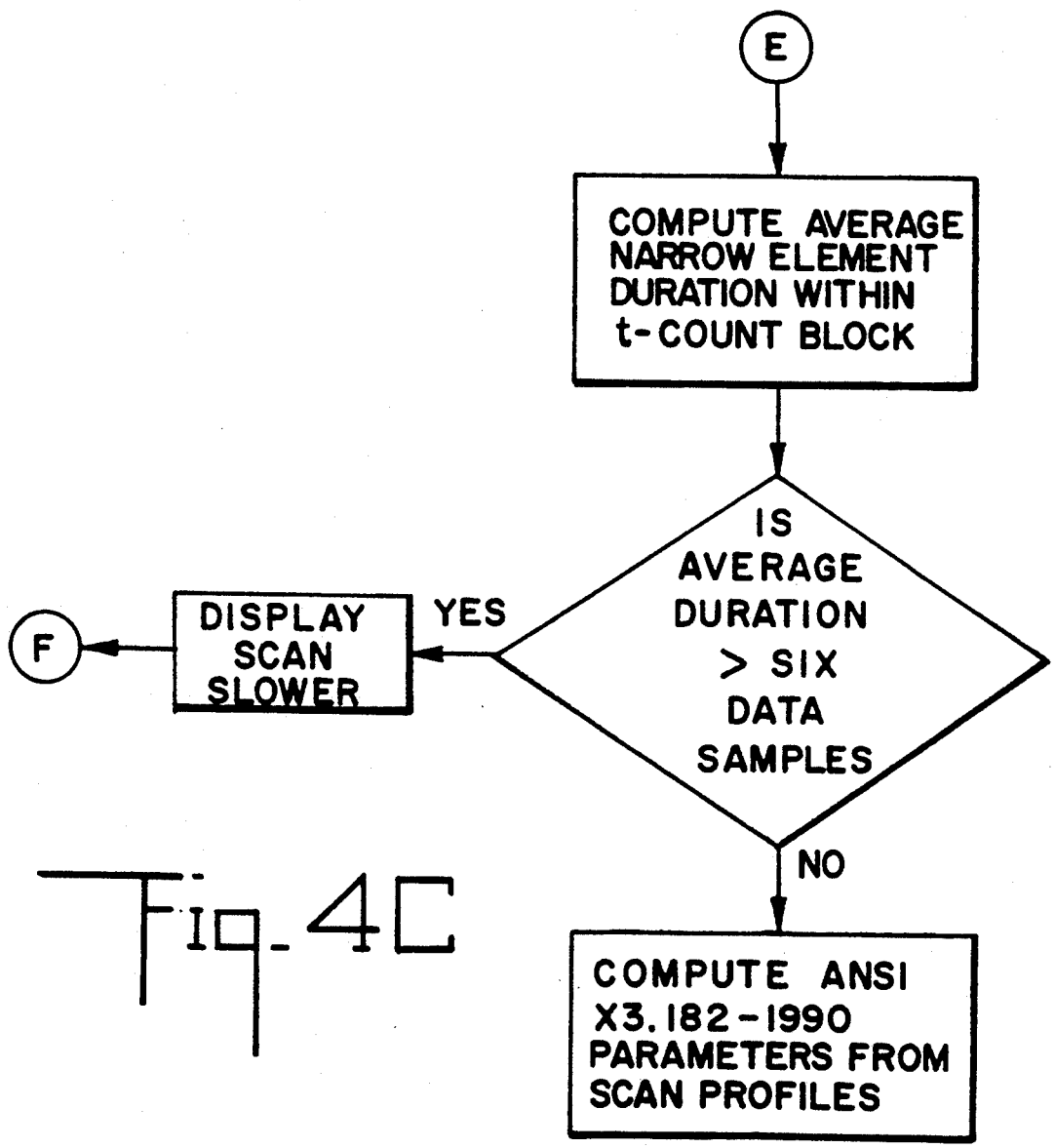

The program then proceeds through the connectors EE to FIG. 4C. There the program operates to determine if the scan occurred faster than desired. First the average narrow element duration of all of the durations in the t-count block is computed. The narrow elements differ in duration depending upon the symbology of the code. For Code 39 the narrow elements are those whose t-counts in each character is less than one-eighth (12.5%) the sum of the t-counts of that character. Generally, these narrow elements are those of width which are the X dimension of the code in accordance with the ANSI standard. If the average duration of the narrow elements in the entire code is less than six samples (t-count is less than six), an output is provided via the computer and the array to the display and the "Scan Slower" message is displayed, and the operator should scan faster on his or her next try.

If no output indicative of the need to scan faster, scan evenly or scan slower is produced (in which case the program has looped back via the connectors CC, DD and FF), the ANSI parameters are computed as discussed above.

From the foregoing description it will be apparent that there has been provided an improved bar code reading instrument which prompts an operator to properly scan a code by a manual scanning process. Variations and modifications in the herein described reader and prompting system, within the scope of the invention, will undoubtedly suggest themselves to those skilled in the art. Accordingly, the foregoing description should be taken as illustrative and not in a limiting sense.

I claim:

1. A bar code reading instrument which comprises means for scanning a bar code having successive bar and space elements groups of which represent successive characters to provide while scanning a bar code signal, means responsive to said bar code signal for generating at a constant rate successive data signal samples of said bar code signal constituting a scan profile of the bar code, a digital data memory, means for entering said samples in a block of digital data locations in said memory, a display for messages concerning the bar code, means responsive to the number of said samples entered into said memory in said elements for providing outputs representing improper modes in which said code was manually scanned, and means for operating said display to provide messages corresponding to said outputs.

2. The instrument as set forth in claim 1 further comprising means responsive to said the number of samples in said elements for detecting when said scan profile represents a valid bar code, said improper scanning modes outputs providing means includes means operative to provide said outputs when said valid code is detected.

3. The instrument as set forth in claim 2 further comprising means operative when said outputs are not provided for analyzing said scan profile and providing data to said display representing print quality parameters of said bar code.

4. The instrument according to claim 3 further comprising means for operating said display with said print quality parameter data to provide messages corresponding to said data.

5. The instrument according to claim 2 wherein said improper scanning modes outputs providing means comprises means responsive to the difference between the number of said samples in successive ones of said characters for providing an output corresponding to uneven scanning wherein said difference is greater than a predetermined magnitude.

6. The instrument according to claim 5 wherein said magnitude expressed as a percentage at least 25%.

7. The instrument according to claim 5 wherein said means for operating said display provides a message prompting an operator to scan evenly in response to said output.

8. The instrument according to claim 2 wherein said improper scanning modes outputs providing means comprises means responsive to the number of samples in said scanning profile containing the valid bar code exceeding the capacity of said block for data signals for providing an output corresponding to manual scanning at a speed less than a desired speed.

9. The instrument according to claim 8 wherein said means responsive to said samples in said profile exceeding the capacity of said block comprises means responsive to the number of samples between elements of said code corresponding to quiet zones at the ends of a valid code exceeding said capacity.

10. The instrument according to claim 8 wherein said means for operating said display provides a message prompting an operator to scan faster in response to said output.

11. The instrument according to claim 2 wherein said improper scanning modes outputs providing means comprises means responsive to the average number of samples in the narrow elements of the valid code exceeding a predetermined number for providing an output corresponding to manual scanning at less than a desired speed.

12. The instrument according to claim 11 wherein narrow said predetermined number is less than six.

13. The instrument according to claim 11 wherein said means for operating said display provides a message prompting an operator to scan slower in response to said output.

14. The instrument in accordance with claim 2 wherein said improper scanning modes outputs providing means comprises
  (a) means responsive to the difference between the number of said samples in successive ones of aid characters for providing a first output corresponding to uneven manual scanning wherein said difference is greater than a predetermined magnitude;
  (b) means responsive to the number of samples in said scanning profile containing the valid bar code exceeding the capacity of said block for data signals for providing a second output corresponding to manual scanning at a speed less than a desired speed; and
  (c) means responsive to the average number of samples in the narrow elements of the valid code exceeding a predetermined number for providing a third output corresponding to manual scanning at less than a desired speed.

15. The instrument according to claim 14 wherein
  (a) said means for operating said display provides a message prompting an operator to scan evenly in response to said first output;
  (b) said means for operating said display provides a message prompting an operator to scan faster in response to said second output; and
  (c) said means for operating said display provides a message prompting an operator to scan slower in response to said third output.

* * * * *